United States Patent [19]

Toy et al.

[11] 4,203,723
[45] May 20, 1980

[54] VITRA-VIOLET PROCESS FOR PRODUCING FLAME RESISTANT POLYAMIDES AND PRODUCTS PRODUCED THEREBY

[76] Inventors: James C. Fletcher, Administrator of the National Aeronautics and Space Administration, with respect to an invention of Madeline S. Toy, Palo Alto; Roger S. Stringham, Woodside, both of Calif.

[21] Appl. No.: 747,674

[22] Filed: Dec. 6, 1976

[51] Int. Cl.² ............................................. C08F 8/00
[52] U.S. Cl. ............................. 8/115.5; 8/DIG. 12; 8/DIG. 18; 204/159.15; 204/159.19; 525/426
[58] Field of Search .................. 204/159.15, 159.19; 8/115.5

[56] References Cited

U.S. PATENT DOCUMENTS

| | | | |
|---|---|---|---|
| 3,088,791 | 5/1963 | Cline et al. | 204/159.15 X |
| 3,101,275 | 8/1963 | Cairns et al. | 204/159.15 X |
| 3,412,175 | 11/1968 | Magat et al. | 204/159.15 X |
| 3,816,284 | 6/1974 | Kagiya et al. | 204/159.17 |
| 3,933,607 | 1/1976 | Needles et al. | 204/159.15 |

*Primary Examiner*—Richard B. Turer
*Attorney, Agent, or Firm*—Marvin J. Marnock; John R. Manning; Marvin F. Matthews

[57] ABSTRACT

A process for producing aromatic polyamides having improved nonflammability characteristics in which a polyamide substrate is contacted with a gaseous medium comprising a minor amount of a haloolefinic material and an inert diluent in the presence of light having sufficient energy to effect chemical addition of the haloolefin to said polyamide substrate.

7 Claims, No Drawings

VITRA-VIOLET PROCESS FOR PRODUCING FLAME RESISTANT POLYAMIDES AND PRODUCTS PRODUCED THEREBY

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates to a photochemical process for grafting haloolefins onto polyamide substrates and to products produced thereby.

2. Brief Description of the Prior Art

In space exploration, extravehicular activity (EVA) is essential. Such activity necessarily requires the use of high strength fibrous materials from which to fabricate garments, carrying bags and the like used in such activity. In addition to having the necessary physical properties, the materials employed must be flame resistant in high oxygen atmospheres. In space vehicles, it is common to encounter highly oxygen enriched atmospheres. This is also true of deep sea diving vessels. Thus, for example, while many synthetic polymeric materials possess suitable mechanical and physical properties which make them ideally suited for the manufacture of fabrics useful in space and deep sea exploration, they suffer from the infirmity that they are not sufficiently flame retardant and indeed, in many cases, are highly flammable in such oxygen enriched environments.

The fiber forming aromatic polyamides such as poly (m-phenyleneisophthalamide) are ideally suited in many respects for fabrics used in space travel and deep sea exploration. However, these materials are not flame resistant in highly enriched oxygen atmospheres, i.e. oxygen contents of around 30% by volume. Heretofore, it has been proposed to improve the flame resistance of such materials through chemical modification by phosphorylation and halogenation. However, such treatments strongly color the fibers and also degrade the aromatic polyamide thereby reducing many of its mechanical properties.

It is known that unsaturated monomeric materials can be grafted to polymeric substrates using various irradiation techniques. Examples of such processes can be found in U.S. Pat. Nos. 2,956,899 to Cline, 3,412,175 to Magat et al, and 3,933,607 to Needles et al. The process of the Cline patent involves irradiating polymeric substrates in the presence of a controlled amount of oxygen followed by contacting the activated substrate with a liquid polymerizable monomer. The Magat et al patent discloses a grafting technique in which the polymeric substrate is contacted with a fluorinated monomer in the presence of high energy radiation. The Magat process like the Cline process suffers from the infirmity that the polymeric substrate must be soaked in the liquid monomer or a solution thereof. The Needles et al patent discloses the vapor phase photografting of monomers onto polymeric substrates but requires a two-step process in which the substrate is first treated with a wetting agent following which the substrate is contacted with a photosensitizer and the monomer in the presence of a radiation source.

SUMMARY OF THE INVENTION

It is therefore an object of the present invention to provide a novel process for imparting flame retardancy to aromatic polyamides in oxygen enriched atmospheres.

Another object of the present invention is to provide a simple, one-step process for grafting haloolefins onto polyamide substrates.

A further object of the present invention is to provide aromatic polyamides having greatly enhanced fire retardancy.

Still another object of the present invention is to provide polyamides having reduced water wettability characteristics.

Yet another object of the present invention is to provide photografted polyamides which show increased resistance.

The above and other objects of the present invention will become apparent from the description herein and the appended claims.

In accordance with the above stated objects, the present invention provides a method of photochemically producing aromatic polyamides containing chemically bonded or grafted halocarbon groups, the method comprising contacting the aromatic polyamide substrate, preferably in a sealed chamber, with a gaseous medium containing a haloolefinic material, in a minor amount, and an inert diluent, while irradiating the aromatic polyamide substrate with radiation of sufficient energy to effect chemical bonding or grafting of the haloolefin to the substrate.

The invention also contemplates products produced by the above described method, the products consisting of the aromatic polyamide substrate having halocarbon groups chemically bound to the surface thereof.

DESCRIPTION OF THE PREFERRED EMBODIMENT

The polyamide substrates which are usable in the present invention are the fiber-forming polyamides having an aromatic nucleus as well as an amide linkage as an integral part of the polymeric backbone. Typical such polyamides include poly (hexamethylene isophthalamide), poly (2-methyl hexamethylene terephthalamide), poly (m-xylylene adipamide) poly (m-pheneyleneisophthalamide), etc. It is to be understood that copolymers having two or more components, as well as polymer and copolymer mixtures of the above are also included. Particularly preferred as the polyamide substrate is poly (m-phenyleneisophthalamide) sold under the trade name NOMEX by the Dupont Company. Fibers of NOMEX polyamide have found widespread use in products aimed for applications in space and deep sea exploration. The polyamide substrate can be used in virtually any form. Preferably, however, the substrate will be in the form of film, fibers, or other such preformed shapes which presents a large surface area for grafting with the haloolefins.

The haloolefin materials which are used in the present invention are primarily fluoro containing compounds having from 2 to 4 carbon atoms. The term "haloolefinic material" is intended to include one or more individual compounds. Typical of such compounds include tetrafluoroethylene, bromotrifluoroethylene, chlorotrifluoroethylene, etc. Particularly preferred compounds are tetrafluoroethylene and bromotrifluoroethylene.

As indicated above, the haloolefin is present in the photografting process of the present invention in gaseous or vapor form. If the haloolefin has a high vapor pressure, and accordingly a very low boiling point, provision of a gaseous medium presents no problem. However, in cases where the haloolefin is liquid at ambient temperatures, it may be vaporized either by heating or, in the alternative, by entraining vapors of the normally liquid haloolefin in an inert gaseous medium or other gaseous haloolefin being supplied to the reaction vessel.

It has been found that the photografting of the polyamide substrate with the haloolefin should be conducted in the presence of an inert diluent. Suitable inert diluents include nitrogen, argon, helium, etc. It is believed that the inert diluent serves to reduce homopolymerization of the haloolefin and reduces photo-oxidation effects which would occur if the reaction were conducted in the presence of air or other oxygen containing mediums. Preferably, the gaseous medium comprised of the haloolefin and the inert diluent will contain a minor amount of the haloolefinic material and especially from about 0.1 to about 25 mole % of the haloolefinic material. More preferably, the haloolefin content will be from about 2 to about 15 mole %. A particularly desirable gaseous medium is provided by a vapor composition containing about 10 mole % of a mixture of bromotrifluoroethylene and tetrafluoroethylene, in various ratios, in admixture with about 90 mole % nitrogen. In general, it has been found that if the gaseous medium contains a higher percentage of haloolefinic material containing bromine, the modified polyamide substrate shows enhanced flame resistance. Thus, in gaseous mediums containing 95% mole nitrogen and 5 mole % haloolefinic material in an 80/20 ratio of bromotrifluoroethylene to tetrafluoroethylene, respectively, the modified polyamide substrate is found to be self-extinguishing in an oxygen enriched environment, e.g. 31% (volume) $O_2$, 69% (volume) $N_2$ at 10 PSIA. In cases where the gaseous medium contains higher amounts, e.g. 10 mole % of the haloolefinic material relative to the inert diluent, ratios of tetrafluoroethylene to bromotrifluoroethylene of 80/20, respectively, produce polyamide substrates which are self-extinguishing in an oxygen enriched environment, e.g. 31% (volume) $O_2$, 69% (volume) $N_2$ at 10 PSIA. The photografting of the haloolefinic material to the polyamide substrate involves largely surface treatment of the latter. Since virtually monomolecular layers of the grafted halocarbon groups will achieve changes in the physical properties of the polyamide substrate, precise amount of the haloolefinic material in the gaseous medium can vary quite widely. Thus, for example, a very minute amount of the haloolefinic material in the gaseous medium may not be sufficient to impart the desired degree of nonflammability to the polyamide substrate in an enriched oxygen atmosphere. However, such a minute amount might still be sufficient to make the polyamide substrate non-water wettable.

In conducting the photografting of the haloolefin to the polyamide substrate, it is desirable that the pressure of the gaseous medium be maintained at between about 20 mm Hg to about 5 atmospheres. Particularly desirable are pressures in the neighborhood of 400 to 800 millimeters Hg. It will be appreciated that the precise pressure employed will depend on the composition of the gaseous medium, the temperature, the desired degree of grafting, etc.

Suitable apparatus for carrying out the method of the present invention includes a closed chamber which can be evacuated using a suitable vacuum source. The chamber can also be provided with means to introduce the gaseous medium and in this respect can have one inlet in which both the inert diluent and the haloolefinic material are introduced or two inlets in which the two components are introduced separately. Provision should be made such that the irradiated surface of the polyamide substrate can be maintained at a substantially equal distance from the radiation source. Thus, for example, a centrally located source of radiation and means for mounting the substrate on the arc line formed with a source of light emanating from the center can be used. The reaction can be carried out in a batch or continuous fashion. In the former case, the substrate would be suspended in the chamber in the presence of the haloolefinic material for the desired radiation time. In the latter case, the substrate would have to be rolled or somehow uniformly moved past the radiation source and a system provided to maintain the pressure and composition of the gaseous medium at some substantially constant level.

The photoaddition of the haloolefinic material to the polyamide substrate is effected by irradiating the reaction chamber containing the substrate and the gaseous medium with radiation having sufficient energy to effect chemical bonding of the haloolefin to the polyamide substrate. A suitable source of irradiation comprises ultraviolet light having a wave length of about 1800 A° or greater.

It is believed that the photografted process of the present invention involves the formation of free radical sites on the polyamide substrate followed by the subsequent addition of the unsaturated halogen containing compound. The use of relatively low energy radiation, i.e. u.v. light, coupled with the vapor phase reaction in which the gaseous medium contains a minor amount of haloolefin prevents any large scale homopolymerization of the haloolefin and, moreover, leads primarily to surface bonding of the haloolefins to the polyamide substrate. Restricting the grafting to surface bonding of the haloolefin precludes any major structural alteration of the polyamide substrate which might interfere with mechanical properties such as strength, elongation, modulus, tensile, etc.

In conducting the photoaddition process, the temperature may vary from 0° to around 150° C. It will be appreciated that temperatures sufficient to adversely affect the mechanical properties of the polyamide substrate should be avoided. However, in general, aromatic based polyamides are able to withstand temperatures as high as 150° C. without noticable loss of physical or mechanical properties. Additionally, excessively high temperatures may result in unwanted homopolymerization of the haloolefin. The precise temperature employed will depend upon the haloolefin used and the type of polyamide substrate. Thus for example, in the case where the haloolefin had a relatively low vapor pressure or is a liquid at room temperature, higher temperatures would be necessitated in order to maintain the haloolefin in the vapor form.

It will be appreciated that the intensity and time of irradiation can vary widely. Thus, at higher intensities, the photoaddition process occurrs at a relatively higher rate while as the intensity of radiation decreases the rate of photoaddition decreases. In general, the time and intensity of radiation will be such as to achieve the desired degree of photoaddition of the haloolefin to the substrate.

To more fully illustrate the present invention, the following nonlimiting example is presented.

EXAMPLE

The polyamide used was NOMEX HT-10-41 woven fabric. A length of the polyamide substrate was suspended in a cylindrical Pyrex reaction vessel having a centered quartz sleeve for receiving a Pen Ray ultraviolet light. The reaction vessel was heated using a heating tape or infra-red lamps. The reaction vessel was evacuated following which measured amounts of gaseous haloolefins as neat or in mixtures of specified ratios was introduced alternately with anhydrous nitrogen to a specified pressure, temperature, and photolysis time. The following reaction parameters were employed;

Total pressure: 635 mm Hg
Photolysis time: 2.5 hours
Temperature: 100° C.

At the end of the irradiation time, the reaction vessel was evacuated and air was introduced. The photografted fabric samples were washed with fluorotrichloromethane and dried under vacuum for subsequent testing.

Flammability tests were conducted on samples (2.5×5 inches) of the various photografted polyamide substrates obtained as per the above procedure. The flammability tests were conducted in an atmosphere comprised of 31% by volume oxygen and 69% by volume nitrogen at 10 psia. The results of the flammability tests are shown in the table below for various polyamide substrates modified using varying compositions of haloolefins and nitrogen.

| Sample No. | VAPOR COMPOSITION IN REACTOR Mole % | | | Flammability Characteristics of Photografted Polyamide Substrates |
|---|---|---|---|---|
| | $N_2$ | $C_2F_3Br$ | $C_2F_4$ | |
| 1 | 97.5 | 2.0 | 0.5 | Burned |
| 2 | 95.0 | 4.0 | 1.0 | SE' |
| 3 | 95.0 | 3.0 | 2.0 | Burned |
| 4 | 95.0 | 2.0 | 3.0 | Burned |
| 5 | 95.0 | 1.0 | 4.0 | Burned |
| 6 | 90.0 | 8.0 | 2.0 | SE |
| 7 | 90.0 | 6.0 | 4.0 | SE |
| 8 | 90.0 | 4.0 | 6.0 | SE |
| 9 | 90.0 | 2.0 | 8.0 | SE |
| 10 | 80.0 | 16.0 | 4.0 | SE |
| 11 | 80.0 | — | 20.0 | Burned |

'Self Extinguishing

As can be seen from the above data, depending on the type and amount of the haloolefin material in the gaseous medium, the polyamide substrates can be made self-extinguishing even in highly oxygen enriched atmospheres.

All modified polyamide substrates, whether self-extinguishing or not, were found to be substantially unwettable as opposed to the untreated polyamide substrates which were water absorbent. In addition, the treated polyamide substrates are softer and silkier, have improved acid resistance and display almost no color change.

Infrared spectroscopic analysis (transmission and ATR) failed to show any significant difference between the treated and untreated polyamide substrates. This lack of any IR absorption for C-F bonds suggest the monomolecular-like character of the modified surface.

Samples of the photografted polyamide substrates were treated with 70% sulfuric acid for 80 seconds. Using a scanning electron microscope, photomicrographs were taken of the surface and edge views of the acid treated substrates. It was noted from the edge views that the un-modified surfaces of the aromatic polyamide substrates were strongly etched by the concentrated acids. Those surfaces, of course, were not subjected to any photoaddition of the haloolefin. On the contrary, the surfaces of the polyamide substrate which had been modified by the photografting were affected by the acid at a substantially decreased rate.

The presence of chemically bonded fluorocarbon groups to the surface of the polyamide substrate was confirmed by $F^{19}$ NMR spectroscopy. Indeed, the NMR spectra rule out the possibility that the modified polyamide substrate contain any significant quantity of homopolymer.

We claim:

1. A one step method to chemically modify aromatic polyamide fibrous products formed of poly-m-phenyleneisophthalamide to improve flame resistance properties and appearance of the aromatic polyamide fibrous product consisting essentially of contacting the aromatic polyamide substrate in a chamber with a gaseous medium containing haloolefinic material consisting of a mixture of tetrafluoroethylene and bromotrifluoroethylene and an inert diluent while irradiating said aromatic polyamide with ultraviolet light having sufficient energy to effect chemical bonding of said haloolefinic material to said aromatic polyamide.

2. The method of claim 1 wherein said irradiation is conducted at a temperature of from about 0°–150° C.

3. The method of claim 1 wherein said inert diluent comprises nitrogen.

4. The method of claim 1 including placing said substrate in a closed chamber, evacuating said chamber and introducing said gaseous medium into said chamber.

5. The method of claim 4 wherein the pressure of said gaseous medium in said chamber is from about 400 to about 800 millimeters Hg.

6. The method of claim 1 wherein said gaseous medium comprises from about 0.1 to about 25 mole % of said haloolefinic material.

7. A product formed by the method of claim 1.

* * * * *